May 24, 1966     E. C. LAFFERTY     3,252,356
GEAR REDUCTION UNIT
Original Filed Sept. 12, 1960
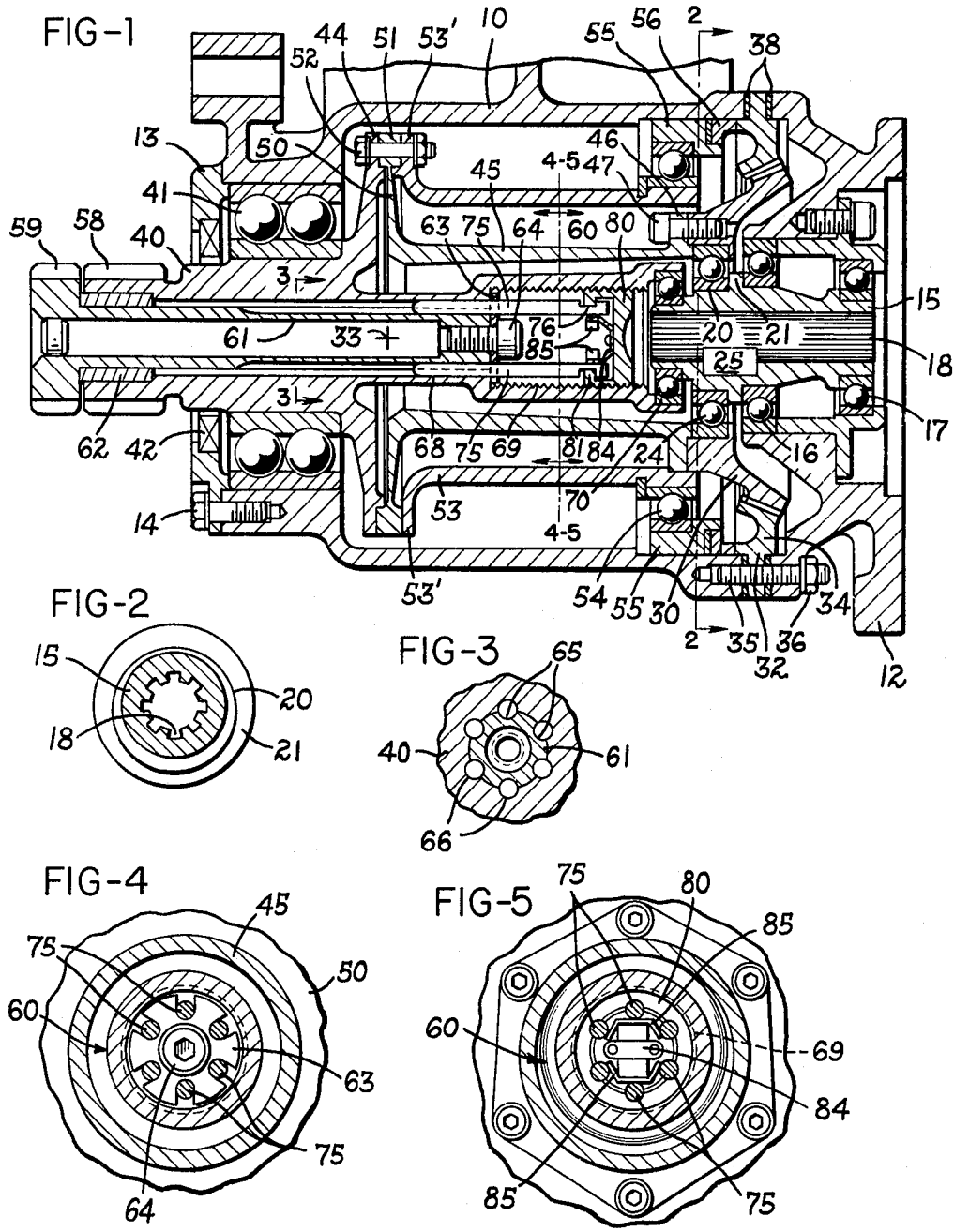
INVENTOR.
EDWARD C. LAFFERTY
BY
ATTORNEYS

United States Patent Office 3,252,356
Patented May 24, 1966

3,252,356
GEAR REDUCTION UNIT
Edward C. Lafferty, Springfield, Ohio, assignor to Kelsey-Hayes Company, Springfield, Ohio, a corporation of Delaware
Continuation of application Ser. No. 55,223, Sept. 12, 1960. This application May 10, 1963, Ser. No. 279,638
9 Claims. (Cl. 74—799)

This invention pertains to gear reduction drive units and more particularly to a high ratio epicyclic reduction drive. This application is a continuation of application Serial No. 55,223, filed September 12, 1960, and now abandoned.

This invention provides a gear reduction unit which combines high gear reduction ratios with compact size and relatively low weight. It is also particularly useful as a reversible gear reduction unit which may be used to control the movement and accurate positioning of a load in either of two directions. Such requirements may exist, for instance, in a radar antenna drive wherein the antenna assembly is to be accurately positioned through a gear reduction unit by a drive motor with an absolute minimum of backlash and lost motion.

The gear reduction unit of this invention combines these desirable features and others by the provision of a pair of bevel gears, one being rotatably mounted within the other and having fewer teeth, preferably in the order of one, than the other gear. The generally conical form of the gears provides for the axial adjustment of one of the gears with respect to the other for the purpose of controlling the meshing of the gear teeth and reducing backlash to a minimum.

The inner gear, which comprises an external bevel gear, is mounted on an eccentric drive which causes it to revolve in meshing relation with the internal bevel teeth of the outer gear. This movement is translated to an output shaft through a flexible coupling arrangement which provides for the eccentric motion of the inner gear about the apex of its pitch cone when driven by the input shaft, and, at the same time, connects the output shaft for rotation with the inner gear.

The output shaft includes a spur gear which is split to provide a drive portion and an anti-backlash portion. The gear teeth of these portions of the output gear are biased into offset relation to each other to take up all backlash in the output drive. This biasing mechanism includes a variable flexible coupling through which the anti-backlash gear portion is connected with the drive portion of the output gear. The extent to which these portions of the gear are loaded is determined by the coupling and is variable to assure that no backlash exists at the output drive for either direction of rotation. An adjustment for this purpose is made available by an opening formed within the input drive shaft.

It is therefore an object of this invention to provide a compact gear reduction unit as outlined above having high gear reduction ratios for the precise reversible control of a driven unit without backlash.

A further object of this invention is to provide a high ratio gear reduction unit as outlined above in a single lightweight package occupying a minimum of space and having a minimum of moving parts.

A further object of this invention is to provide a gear reduction unit as outlined above combining a high ratio epicyclic reduction gear arrangement with an anti-backlash output drive.

A still further object of this invention is to provide a gear reduction unit as outlined above with a pair of bevel intermeshed gears one being eccentrically driven for rolling contact within the other providing for eccentric movement of the external gear about the apex of its pitch cone.

Another object of this invention is to provide a gear reduction unit as outlined above having an inner bevel gear with externally formed teeth arranged for movement on an eccentric drive with the teeth being in engagement with the internal teeth of an outer end relatively fixed bevel gear. These gears are axially adjustable one to the other for the control of the meshing of the teeth.

A particular object of this invention is to provide a gear reduction unit having a variable coupling between an output drive portion and a backlash portion to vary the loading between these portions. An advantage of the arrangement of this invention resides in the fact that the variable coupling is contained entirely within the gear reduction unit and is readily accessible from the outside for the purpose of varying the extent of the coupling to preload the gear portions, as desired.

Other objects and advantages of the invention will be apparent from the following description, the accompanying drawing and the appended claims.

In the drawing:
FIG. 1 is a cross sectional view of a gear reduction unit embodying this invention;
FIG. 2 is a section through the input shaft showing the relation of the eccentric drive portion to the shaft axis taken generally along line 2—2 of FIG. 1;
FIG. 3 is a section through a portion of the output shaft showing the arrangement of the coupling pin grooves taken generally along line 3—3 of FIG. 1; and
FIGS. 4 and 5 are sections taken along the lines 4,5—4,5 of FIG. 1 showing the arrangement of the variable coupling mechanism for effecting the loading of the anti-backlash gear.

Referring to the drawing, which illustrates a preferred embodiment of this invention, a gear reduction unit constructed in accordance with this invention includes a center or main housing 10. The housing 10 is generally tubular in form and includes an axial cavity within which the movable components of the gear reduction unit are fitted. The open ends of the housing are closed by a motor mount housing 12 bolted on one end thereof and a sealing or output end cover 13 secured to the other end by bolts 14.

The motor housing 12 rotatably supports an input shaft 15 on a pair of ball bearings 16 and 17. The shaft 15 is hollow and includes an axial portion which is internally splined at 18 for the purpose of accepting the drive shaft of a drive motor, not shown.

The input drive shaft 15 includes an eccentric drive portion 20 formed thereon and spaced from the bearing 16 by a shoulder 21. The eccentric portion 20 is slightly offset from the axis of the shaft 15, as shown in FIG. 2, and includes a ball bearing 24 mounted thereon. A quantity of metal is removed from within the shaft at 25 for the purpose of balance.

An external bevel gear 30 is rotatably mounted on the bearing 24 for eccentric movement with the portion 20. The teeth of the gear 30 are in meshing relation with the teeth of an internal bevel gear 32 mounted in fixed relation betweeen the housings 10 and 12. The portion 20 and the bearing 24 form means for mounting the gear 30 in mesh with the gear 32 with an axis of rotation offset with respect to the gear 32. The gears 30 and 32 respectively form a pair of inner and outer epicyclic gears, with the inner gear 30 having a fewer number of teeth than the outer gear 32, to effect a reduction in the rotational velocity of the inner gear 30 as compared to the input shaft 15. The gears 30 and 32 are arranged so that the teeth of such gears form pitch cones having generally common apexes indicated at 33

The outer gear 32 is formed with an annular flange 34 received within a space between the main housing 10 and the motor housing 12, and is held in this fixed relation by the stud bolts 35 and nuts 36 which also serve to hold the motor housing 12 on the main housing 10. The gears 30 and 32 are axially positionable one to the other by means varying the thickness of shims 38 positioned between the flange 34 and the housings 10 and 12 to control and obtain the desired meshing between the gears and to eliminate backlash.

The number of teeth of the inner gear 30 as compared to the difference in the number of teeth between the gears determines the reduction ratio of the unit. Preferably, the gears 30 and 32 are formed with one tooth difference, and may for example have 172 and 173 teeth respectively providing a reduction ratio of 172 to 1. It is understood that the number of teeth of the gears 30 and 32, and the difference in such number, may be varied as desired to produce a desired ratio.

The amount of throw of the eccentric portion of the input shaft 15 is determined by the pitch diameters of the two engaging gears, and tooth proportions are selected so as to provide a clearance between the gear teeth at a point diametrically opposite to the high point of the eccentric. Accordingly, the outer gear 32 has an addendum circle of sufficiently greater diameter than that of the inner gear 30 to provide for clearance between theeth of the respective gears at one point when the gears are in mesh one within the other. The amount of such clearance is preferably held to a minimum, consistent with tolerances, in order to maintain as large a portion of the gear teeth in contact as possible.

An output shaft 40 is rotatably supported in the housing 10 on a heavy duty ball bearing 41, and closed by a seal 42 retained by the cover 13. The shaft 40 includes an annular driving flange 44 received within the internal cavity formed by the housing 10.

Flexible coupling means providing for angular movement of the gear 30 about the apex of its pitch cone and for transmitting the rotational motion thereof to the output shaft 40 includes a tubular coupling member 45. The member 45 comprises a flexible coupling shaft and has a mounting flange 46 bolted for movement with the gear 30 by cap bolts 47. The other end of the member 45 forms a relatively thin flexible integral wall 50 terminating in an enlarged ring portion 51 joined in driving relation to the flange 44 of the output shaft 40 by bolts 52.

The wall 50 of the member 45 lies generally in a plane including the apex 33 formed by the pitch cones of the gears 30 and 32, and provides for eccentric or angular movement of the gear 30 about this apex by the flexure of the thin wall 50.

The output shaft 40 is further supported to resist bending moments imparted through the flexible coupling including the wall 50 by means of a tubular sleeve 53 flanged at 53' for connection to the shaft 40 at the bolts 52. The sleeve 53, in effect, forms a rearward stiffening extension of the output shaft 40 and is rotatably mounted at its inner end on ball bearings 54. The bearing 54 is fixedly positioned and supported within the interior of the housing 10 on a bearing support ring 55 and a spacer 56.

The output shaft 40 forms a spur drive output which may be employed to drive a ring gear for the control of a radar antenna or other load requiring precision movement in either direction. The output gear is split to form a driving gear 58 and an anti-backlash gear 59 which are prepositioned into a normally offset relation to each other.

Means for effecting such preload and for varying the coupling between the gears 58 and 59 include a variable coupling mechanism designated generally at 60. The anti-backlash gear 59 is formed with an integral and internal shaft 61 forming a sub-assembly of the drive shaft 40, and is rotatably supported for limited rotation within the shaft 40 on a bronze bushing 62. The gear 59 is retained within shaft 40 by notched washer 63 and held by a screw 64.

The shaft 61 is relatively thin to provide for some torsional bending about its longitudinal axis, and is provided with a plurality of semicylindrical, longitudinally extending grooves 65, as shown in FIG. 3. The interior of the shaft 40 is formed with similar grooves 66, corresponding to the grooves 65 forming pairs of grooves. The shaft 40 is arranged to extend rearwardly of the flange 44 to form a cooperating thin neck portion 68 for limited torsional movement and a somewhat enlarged internally threaded portion 69 for containing the coupling mechanism 60. The threaded portion 69 is supported by a pilot bearing 70 on the innermost end of the input shaft 15.

When the corresponding pairs of grooves 65 and 66 are in alignment as shown in FIG. 3, the spur teeth of the respective gears 58 and 59 are in offset relation to each other. Adjustable coupling means connecting the shafts 40 and 61 and for varying the coupling load when the gears 58 and 59 are in mesh with a driven gear includes a plurality of elongated torque pins 75, one each for each of the adjacent pairs of grooves 65 and 66. The pins 75 are movable together through notches formed in the washer 63 in and out of their grooves to shorten or lengthen the coupling between the shafts 40 and 61 as desired, to provide for the control of the loading between the gears 58 and 59 when they are in mesh with a driven gear.

The pins 75 are moved to vary the coupling between the shafts 40 and 61 by an adjusting nut 80. The nut 80 is threadedly received within the enlarged portion 69 and includes a turned over annular flange 81 which engages the pins 75 at the notches 76. A spring detent 84 is provided in the form of a metal spring clip riveted to the inside surface of the nut, FIG. 5. The detent includes spring arms 85 which engage the pins 75 at their outer ends to hold any given adjustment of the nut 80. Screwdriver access to the nut 80 for rotation adjustment is afforded through the axial opening in the drive shaft 15.

The operation of this invention is largely self-evident from the foregoing description. The rotation of the input shaft 15, as by a high speed motor or other driver connected at the internal splines 18, causes the eccentric movement of the bevel gear 30 on the eccentric portion 20. This causes the gear 30 to "walk" or rotate within the bevel gear 32. The intermeshing relation of the respective teeth of these gears, and the end play between the input shaft 15 and the output shaft 40, are controllable by varying the thickness of the shims 38 to provide an arrangement with ideal tooth contact and very little play or backlash.

The rotational movement of the gear 30 is transmitted by the flexible coupling shaft 45 to the flange 44 of the output shaft 40. It is seen that this eccentric movement is generally about the apex of the pitch cones of the gears, and such motion is absorbed by the flexible wall 50 which is generally in the plane adjacent of the apex 33.

The nut 80 may be adjusted to effect a desired loading of the anti-backlash gear 59 with respect to the drive gear 58. This loading is determined by the requirements of the installation to eliminate all backlash between the driving spur and the driven gear. Adjustment is conveniently had through the opening within the drive shaft 15.

It is therefore seen that this invention provides an axially arranged, compact reduction gear unit having a minimum of moving parts and providing for very high reduction ratios. This unit further provides for control of backlash and is therefore particularly suited for installations where the direction of the output drive is to be reversed, and a driven member is to be controlled with precision. The compact arrangement of the components makes the unit suitable for use with minimum installation space and weight requirements.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An eccentric epicyclic gear transmission for providing a high reduction reversible rotary drive, comprising an inner bevel gear, an outer bevel gear having essentially the same pitch angle as said inner gear and having an addendum of sufficiently greater diameter than that of said internal gear to provide for complete clearance between teeth of the respective gears at one point when the gears are mounted in mesh one within the other, means mounting said inner gear in mesh with said outer gear and with an axis of rotation offset with respect to the axis of said outer gear, means providing for relative axial adjustment movement of said outer gear with respect to said inner gear to control the mesh thereof and reduce backlash therebetween, input means connected to said inner gear arranged to cause orbital motion thereof within said outer gear, an output shaft, and flexible coupling means including an annular, generally radially extending flexible wall positioned in a plane which includes the apex of the pitch cone of said inner gear connecting said output shaft for rotation by said inner gear and providing for angular movement of said inner gear about the apex of its pitch cone.

2. A reversible gear reduction drive unit comprising a housing, an outer bevel gear fixed relative to said housing and having internal teeth formed thereon, an input shaft rotatably mounted in said housing and having an eccentric drive portion formed thereon, an inner bevel gear rotatably mounted on said portion for eccentric movement therewith and having external teeth formed thereon with a pitch cone having an apex in common with the apex of the pitch cone of said outer gear, the teeth of said inner gear being fewer in number than the teeth of said outer gear and arranged for rolling engagement therewith upon the rotation of said input shaft, an output shaft, and means connecting said inner gear to said output shaft including a generally radially extending annular flexible wall positioned generally in the plane including said apex and providing for angular movement of said inner gear by said eccentric about said apex while transmitting the rotation of said gear to said output shaft.

3. The reversible gear unit of claim 2 further comprising said output shaft having a spur driving gear formed thereon, an inner shaft within said output shaft and having an anti-backlash spur gear portion formed thereon in axial alignment with said driving gear and being rotationally movable thereto, said inner shaft having longitudinally extending grooves formed therein, means defining cooperating grooves formed in said output shaft adjacent said grooves of said inner shaft forming pairs of grooves, at least one of said shafts being torsionally bendable about its longitudinal axis adjacent said grooves, the teeth of said spur driving gear and said anti-backlash portion being in offset relation when said pairs of grooves are in alignment with each other, and pins adjustable generally axially of said shafts in said groove pairs to vary the torsional loading between said driving gear and said anti-backlash portion.

4. A reversible gear reduction unit having an anti-backlash drive, comprising a housing, input shaft means rotatably mounted in said housing including an eccentric drive, an inner gear rotatably mounted on said drive for eccentric movement therewith, said inner gear having conical teeth formed on the periphery thereof, an outer gear mounted in normally fixed relation to said housing and having internal conical teeth thereon arranged in meshing engagement with the teeth of said inner gear, means on said housing for positioning said outer gear axially of said inner gear to vary the said engagement of said teeth, the teeth of said inner gear being fewer in number than the teeth of said outer gear and arranged for rolling engagement therewith upon the rotation of said input shaft, an output shaft having a drive gear with an anti-backlash gear portion and a primary drive gear portion, adjustable loading means tending to hold said anti-backlash gear portion in offset relation to said primary drive gear portion to remove all backlash from said gear reduction unit, and flexible coupling means connecting said inner gear in driving relation to said output shaft.

5. A gear reduction unit comprising an input shaft, reduction gearing connected to said input shaft, an output shaft connected to said gearing and having a spur driving gear formed thereon, an inner shaft arranged concentric to said output shaft and having an anti-backlash spur gear portion formed thereon in axial alignment with said driving gear and being rotationally movable thereto, said inner shaft having longitudinally extending grooves formed therein, means defining cooperating grooves formed in said ouput shaft adjacent said grooves of said inner shaft forming pair of grooves, at least one of said shafts being torsionally bendable about its longitudinal axis over a region adjacent said grooves, the teeth of said driving gear and said anti-backlash portion being in offset relation when said pairs of grooves are in alignment with each other, and pins movable axially of said shafts in said grooves at said region to vary the torsional loading between said driving gear and said anti-backlash portion.

6. A gear reduction unit comprising an input shaft, reduction gearing connected to said input shaft, an output shaft connected to said gearing and having a spur driving gear formed thereon, an inner shaft arranged concentric to said output shaft and having an anti-backlash spur gear portion formed thereon in axial alignment with said driving gear and being rotationally movable thereto, said inner shaft being torsionally bendable over an axial portion about its longitudinal axis and having longitudinally extending grooves formed therein at said axial portion, means defining cooperating grooves formed in said output shaft adjacent said grooves of said inner shaft forming pairs of grooves, the teeth of said driving gear and said anti-backlash portion being in offset relation when said pairs of grooves are in alignment with each other, pins movable axially of said shafts in said grooves to vary the torsional loading between said driving gear and said anti-backlash portion, and a nut threadedly received in said output shaft and accessible through said input shaft and arranged to effect in and out adjustment of said pins in said grooves.

7. A reversible gear reduction drive unit comprising a housing, an outer bevel gear fixed relative to said housing and having internal teeth formed thereon, an input shaft rotatably mounted in said housing and having an eccentric drive portion formed thereon, an inner bevel gear rotatably mounted on said portion for eccentric movement therewith and having external teeth formed thereon, the teeth of said inner gear being fewer in number than the teeth of said outer gear and arranged for rolling engagement therewith upon the rotation of said input shaft, an output shaft connected to said inner gear and having a spur driving gear formed thereon, an inner shaft arranged concentric to said output shaft and having an anti-backlash spur gear portion formed thereon in axial alignment with said driving gear and being rotationally movable thereto, said inner shaft being torsionally bendable over an axial portion about its longitudinal axis and having longitudinally extending grooves formed therein at said axial portion, means defining cooperating grooves formed in said output shaft adjacent said grooves of said inner shaft forming pairs of grooves, the teeth of said driving gear and said anti-backlash portion being in offset relation when said pairs of grooves are in alignment with each other, and pins movable axially of said output shaft in said grooves to vary the loading between said driving gear and said anti-backlash portion.

8. A reversible gear reduction drive unit comprising housing means, an input shaft rotatably mounted in said housing means, reversible reduction gearing means in said housing means, an output shaft rotatably mounted in said housing means and connected to said reduction gearing means, said output shaft having a spur driving gear formed thereon, an inner shaft within said output shaft and having an anti-backlash spur gear portion formed thereon in general axial alignment with said driving gear and being rotationally movable thereto, said inner shaft being torsionally bendable about its longitudinal axis and having longitudinally extending grooves formed at least in a portion thereof, means defining cooperating grooves formed in said output shaft adjacent said grooves of said inner shaft forming pairs of grooves, the teeth of said driving gear and said anti-backlash portion being in offset relation when said pairs of grooves are in alignment with each other, and pins one for each said groove pairs adjustable generally axially of said shaft in said grooves to vary the torsional loading between said driving gear and said anti-backlash portion.

9. An eccentric epicyclic reversible gear transmission for providing a high reduction rotary drive with a minimum of backlash, comprising a fixed housing, an outer bevel gear fixed in relation to said housing, an inner bevel gear having essentially the same pitch angle as said outer gear and having an addendum of sufficiently smaller diameter than that of said outer gear to provide for clearance between the teeth of the respective gears at one point when said gears are in mesh one with the other, said inner gear having one less tooth than said outer gear, an input shaft rotatably mounted in said housing, means mounting said inner gear eccentrically on said shaft for eccentric movement thereon upon the rotation of said input shaft, removable shims positioned between said outer gear and said housing providing for the axial adjustment of said outer gear with respect to said inner gear to provide control of the meshing thereof and the elimination of backlash therebetween, an output shaft rotatably mounted in said housing, and flexible coupling means connecting said output shaft for rotation by said inner gear.

References Cited by the Examiner

UNITED STATES PATENTS

| 70,122 | 10/1867 | Rochow | 74—803 |
| 2,002,669 | 5/1935 | Lesser | 74—804 X |
| 3,020,775 | 2/1962 | Musser | 74—409 X |
| 3,043,164 | 7/1962 | Sundt | 74—804 |

FOREIGN PATENTS 259,432    7/1928    Italy.

DON A. WAITE, *Primary Examiner.*

MARTIN H. FREEMAN, THOMAS C. PERRY,
*Assistant Examiners.*